(12) United States Patent
Hwang et al.

(10) Patent No.: US 11,247,621 B2
(45) Date of Patent: Feb. 15, 2022

(54) VEHICLE TEST SYSTEM AND METHOD FOR CONTROLLING THE SAME

(71) Applicants: HYUNDAI MOTOR COMPANY, Seoul (KR); KIA MOTORS CORPORATION, Seoul (KR)

(72) Inventors: Kyunghun Hwang, Suwon-si (KR); Kyung Taek Lee, Seoul (KR); Dong Su Ha, Hwaseong-si (KR)

(73) Assignees: Hyundai Motor Company, Seoul (KR); Kia Motors Coporation, Seoul (KR)

( * ) Notice: Subject to any disclaimer, the term of this patent is extended or adjusted under 35 U.S.C. 154(b) by 215 days.

(21) Appl. No.: 16/656,846

(22) Filed: Oct. 18, 2019

(65) Prior Publication Data
US 2020/0122654 A1    Apr. 23, 2020

(30) Foreign Application Priority Data
Oct. 19, 2018 (KR) ......................... 10-2018-0125126

(51) Int. Cl.
*B60R 16/023* (2006.01)
*B60W 40/105* (2012.01)
(Continued)

(52) U.S. Cl.
CPC ......... *B60R 16/0231* (2013.01); *B60W 40/08* (2013.01); *B60W 40/105* (2013.01);
(Continued)

(58) Field of Classification Search
CPC ........... H04L 12/40; H04L 2012/40215; H04L 2012/40273; B60W 2540/10;
(Continued)

(56) References Cited

U.S. PATENT DOCUMENTS

| 7,044,889 B2 * | 5/2006 | Habeck | F16D 48/08 |
| | | | 477/175 |
| 7,407,026 B2 * | 8/2008 | Tamor | B60W 20/00 |
| | | | 180/65.28 |

(Continued)

FOREIGN PATENT DOCUMENTS

| EP | 2947447 A1 * | 11/2015 | ............... G07C 5/02 |
| EP | 2947448 A1 * | 11/2015 | .......... G01M 17/007 |

(Continued)

*Primary Examiner* — Atul Trivedi
(74) *Attorney, Agent, or Firm* — Morgan, Lewis & Bockius LLP

(57) ABSTRACT

A test system disposed in a vehicle to repetitively reproduce a driving situation based on a predetermined vehicle speed and a method for controlling, may include determining, by a test controller, at least one of a first value representing an accelerator pedal sensor (APS) command value corresponding to a vehicle speed profile in a specific mode or a second value representing a brake pedal sensor (BPS) command value corresponding to the vehicle speed profile when the vehicle speed profile is determined, converting, by the test controller, at least one of the determined first value or the determined second value, and sending the converted voltage signal from the test controller to a power train controller.

19 Claims, 4 Drawing Sheets

(51) Int. Cl.
*B60W 40/08* (2012.01)
*H04L 12/40* (2006.01)

(52) U.S. Cl.
CPC ......... *H04L 12/40* (2013.01); *B60W 2540/10* (2013.01); *B60W 2540/12* (2013.01); *H04L 2012/40215* (2013.01); *H04L 2012/40273* (2013.01)

(58) Field of Classification Search
CPC ............ B60W 2540/12; B60W 40/08; B60W 40/105; G01M 17/007; G05B 2219/2637; G05B 19/042; B60R 16/0231
USPC .......................................................... 701/70
See application file for complete search history.

(56) References Cited

U.S. PATENT DOCUMENTS

| | | | | |
|---|---|---|---|---|
| 7,854,680 | B2* | 12/2010 | Sugai | B60L 50/16 477/15 |
| 8,170,764 | B2* | 5/2012 | Kaminsky | B60W 20/40 701/70 |
| 10,106,040 | B2* | 10/2018 | Vitullo | B60T 7/22 |
| 10,336,316 | B2* | 7/2019 | Kuang | B60W 20/00 |
| 2004/0034460 | A1* | 2/2004 | Folkerts | B60W 10/11 701/54 |
| 2007/0280505 | A1* | 12/2007 | Breed | B60W 40/08 382/104 |
| 2009/0105898 | A1* | 4/2009 | Wu | B60K 6/365 701/33.7 |
| 2009/0112416 | A1* | 4/2009 | Heap | B60W 20/00 701/54 |
| 2009/0112417 | A1* | 4/2009 | Kaminsky | B60W 10/08 701/54 |
| 2013/0238166 | A1* | 9/2013 | Breu | G01M 17/007 701/2 |
| 2014/0100730 | A1* | 4/2014 | Park | B60W 20/20 701/22 |
| 2014/0297098 | A1* | 10/2014 | Yoshimoto | G01M 17/007 701/31.4 |
| 2015/0338313 | A1* | 11/2015 | Tanaka | G01M 17/007 701/32.8 |
| 2016/0288781 | A1* | 10/2016 | Shim | B60W 40/1005 |
| 2016/0362101 | A1* | 12/2016 | Park | B60W 20/20 |
| 2019/0279447 | A1* | 9/2019 | Ricci | B60R 25/00 |
| 2020/0122654 | A1* | 4/2020 | Hwang | B60R 16/0231 |

FOREIGN PATENT DOCUMENTS

| | | | | |
|---|---|---|---|---|
| EP | 2950074 A1 | * | 12/2015 | .......... G01M 17/007 |
| KR | 20200044407 A | * | 4/2020 | .......... G05B 19/042 |
| WO | WO-2021037664 A1 | * | 3/2021 | .......... B60T 8/3255 |

* cited by examiner

VEHICLE TEST SYSTEM AND METHOD FOR CONTROLLING THE SAME

CROSS-REFERENCE TO RELATED APPLICATION

The present application claims priority to Korean Patent Application No. 10-2018-0125126 filed on Oct. 19, 2018, the entire contents of which is incorporated herein for all purposes by this reference.

BACKGROUND OF THE INVENTION

Field of the Invention

The present invention relates to a test system installed in a vehicle to repetitively reproduce a driving situation based on a predetermined vehicle speed and a method for controlling the same.

Description of Related Art

Recently-developed vehicles are required not only to secure high fuel economy, but also to satisfy strict exhaust gas regulations. For determination as to whether or not certified fuel economy and exhaust gas regulations are satisfied, test modes are stipulated by laws and regulations. A predetermined vehicle speed profile is also defined on a test mode basis. Here, the vehicle speed profile defines a target speed to be followed by a vehicle in accordance with passage of time for a test time. In North America, there are a total of five modes of FTP/HWY/US06/SC03/Cold FTP in association with the vehicle speed profile. On the other hand, in Europe, there are two modes of NEDC/WLTP in association with the vehicle speed profile. Furthermore, there is a vehicle speed profile for a vehicle durability test. Furthermore, a vehicle speed profile may be determined using real road travel data of various drivers.

An actual test is conducted such that a vehicle is installed on an apparatus of measuring fuel economy/exhaust gas, for example, a chassis dynamometer, and an amount of exhaust gas is measured and fuel economy is determined after the driver directly drives the vehicle to follow a predetermined vehicle speed profile. To follow the vehicle speed profile, manipulation of an accelerator pedal and a brake pedal is typically conducted. This will be described with reference to FIG. 1.

FIG. 1 shows an example of a vehicle configuration for general vehicle speed control.

Referring to FIG. 1, when the driver manipulates an accelerator pedal or a brake pedal, an accelerator pedal sensor (APS) or a brake pedal sensor BPS sends a voltage signal corresponding to a manipulation amount of the accelerator pedal or the brake pedal to a power train controller, for example, an engine management system (EMS), a transmission control unit (TCU), a hybrid control unit (HCU), or the like.

However, even when the driver repetitively tests the same vehicle speed profile, deviation among tests may occur. In the case of an eco-friendly vehicle such as a hybrid vehicle or an electric vehicle, a long time is taken for a distance-to-empty (DTE) test and, accordingly, the deviation may increase due to fatigue accumulation of the driver. To solve the present problem, a robot driver is often employed, in place of the human driver. This will be described with reference to FIG. 2.

FIG. 2 is a view explaining a concept of a general robot driver.

Referring to a left side of FIG. 2, a robot driver 10 to be mounted on a driver seat is illustrated. The robot driver 10 may include a plurality of robot legs for physically controlling an accelerator pedal, a brake pedal, a clutch pedal, etc. of a vehicle, a robot arm for manipulating a lever of a transmission, etc. Operation of the robot legs and the robot arm may be controlled in accordance with a vehicle speed profile. The robot driver 10 as mentioned above is mounted at a driver seat of the vehicle, as illustrated at a right side of FIG. 2. The robot legs and arm are appropriately calibrated in accordance with the installation position of the robot driver 10.

When the robot driver as mentioned is applied, deviation among tests may be greatly reduced, as compared to the test driver. Accordingly, efficient fuel economy/drivability development tasks may be achieved.

However, such a robot driver requires a relatively long installation time. After installation, additional calibration according to a seat position or a pedal position in the vehicle is also required. For the present reason, even in the same vehicle, a deviation may be generated due to use of a mechanical link mechanism when the robot driver is re-installed after being separated. Furthermore, high costs are consumed for use of such a robot driver. Furthermore, since the robot driver physically occupies the driver seat, there are problems in that the robot driver may be used only in a dynamometer environment, and a test in real road conditions using the robot driver is impossible.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle test system and a method for controlling the same that substantially obviate one or more problems due to limitations and disadvantages of the related art.

Various aspects of the present invention are directed to providing a vehicle test system configured for more conveniently performing a vehicle test, and a method for controlling the same.

Various aspects of the present invention are directed to providing a vehicle test system configured for repetitively reproducing a driving environment according to a vehicle speed profile without occupying the driver seat, and a method for controlling the same.

Additional advantages, objects, and features of the exemplary embodiments will be set forth in part in the description which follows and in part will become apparent to those having ordinary skill in the art upon examination of the following or may be learned from practice of the embodiments. The objectives and other advantages of the exemplary embodiments may be realized and attained by the structure pointed out in the written description and claims hereof as well as the appended drawings.

To achieve these objects and other advantages and in accordance with the embodiments, as embodied and broadly described herein, a method for controlling a vehicle test system includes determining, by a test controller, at least one of a first value representing an accelerator pedal sensor (APS) command value corresponding to a vehicle speed profile in a specific mode or a second value representing a brake pedal sensor (BPS) command value corresponding to the vehicle speed profile when the vehicle speed profile is determined, converting, by the test controller, at least one of the determined first value or the determined second value, and sending the converted voltage signal from the test controller to a power train controller.

In another aspect of the present invention, a vehicle test system includes a test controller including a processor for determining at least one of a first value representing an accelerator pedal sensor (APS) command value corresponding to a vehicle speed profile in a specific mode or a second value representing a brake pedal sensor (BPS) command value corresponding to the vehicle speed profile when the vehicle speed profile is determined, and a converter for converting at least one of the determined first value or the determined second value, and a vehicle to be tested, the vehicle including a power train controller for receiving the converted voltage signal, controlling a power train.

The vehicle test system associated with at least one of the exemplary embodiments of the present invention configured as described above may provide a more convenient test environment.

The vehicle test system is connected to the vehicle through a connector and, accordingly, installation and separation of the vehicle test system may be convenient. Furthermore, pedals are not physically directly manipulated and, accordingly, the vehicle test system is not influenced by position deviations caused by installation positions of the pedals.

Furthermore, the test system according to an exemplary embodiment of the present invention does not occupy a driver seat, and provides various modes using a switch, and, accordingly, the driver may execute a real road test under the condition that the driver is accommodated on the driver seat.

Effects of the present invention are not limited to the above-described effects. Other effects not described in an exemplary embodiment of the present invention may be readily understood by those skilled in the art through the following description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
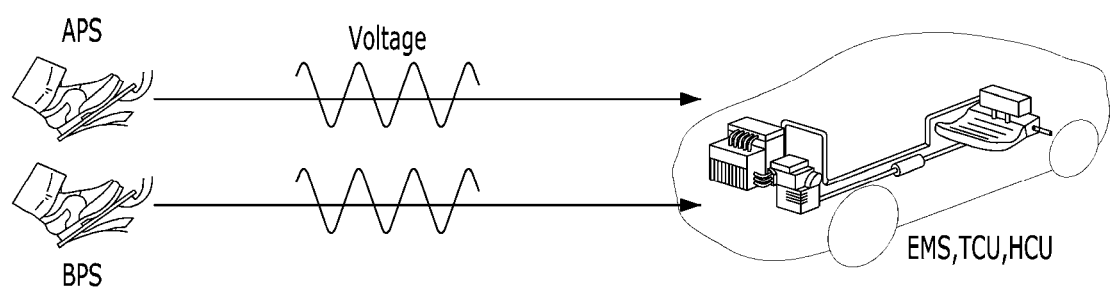
FIG. 1 is a view showing an example of a vehicle configuration for general vehicle speed control.
Figure 2:
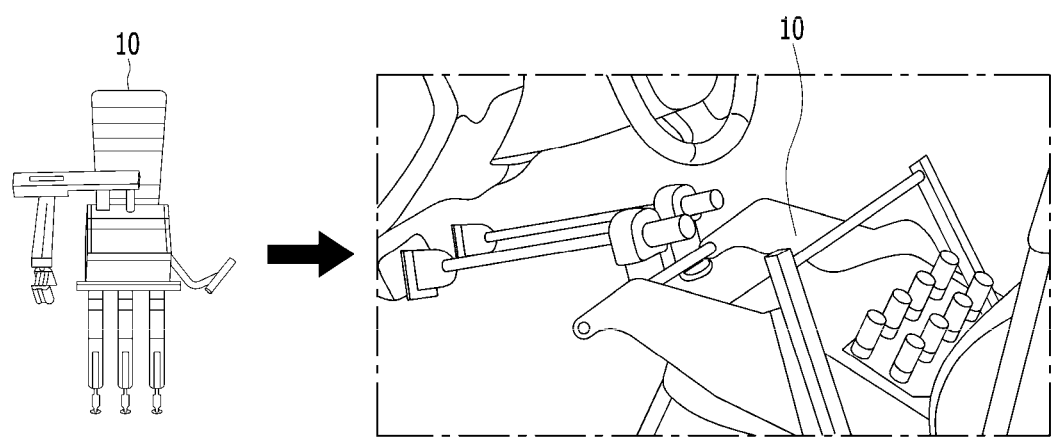
FIG. 2 is a view explaining a concept of a general robot driver.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The terms "including", "comprising", "having" and variations thereof disclosed herein mean "including but not limited to" unless expressly specified otherwise, and, Accordingly, should not be construed to exclude elements other than the elements disclosed herein and should be construed to further include additional elements. Elements designated by the same reference numerals throughout the specification mean the same constituent elements.

Embodiments of the present invention propose a vehicle test system configured for directly sending signals corresponding to pedal manipulation amounts of pedals according to a speed profile, in place of physical manipulation of pedals at the side of a driver seat, and a method for controlling the vehicle test system.

Figure 3:
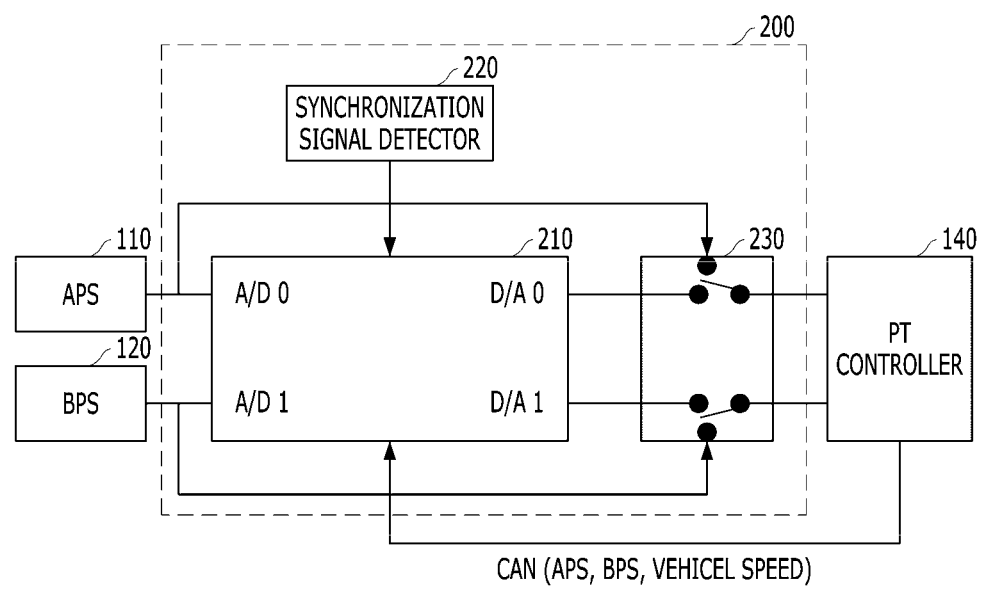
FIG. 3 is a block diagram illustrating an example of a configuration of a test system according to an exemplary embodiment of the present invention.

FIG. 3 illustrates an example of a configuration of a test system according to an exemplary embodiment of the present invention.

Referring to FIG. 3, the test system according to the exemplary embodiment of the present invention may include constituent elements at the side of a vehicle and constituent elements at the side of a test unit 200. The vehicle-side constituent elements may include an accelerator pedal sensor (APS) 110, a brake pedal sensor (BPS) 120, and a power train (PT) controller 140. The test unit 200 may include a test controller 210, a synchronization signal detector 220, and a mode switch 230. The test unit 200 may be configured to be separably attached to the vehicle. The test controller 210 may be connected to the vehicle-side constituent elements, that is, the accelerator pedal sensor 110, the brake pedal sensor 120, the power train controller 140, etc., via at least one connector. For example, connectors of the accelerator pedal sensor 110 and the brake pedal sensor 120 may be coupled to an input terminal of the power train controller 140 in a separated state of the test unit 200, but may be coupled to an input terminal of the test unit 200 in an installed state of the test unit 200. Furthermore, when the test unit 200 is installed, an output terminal of the mode switch 230 may be connected to the input terminal of the power train controller 140. Of course, it will be appreciated by those skilled in the art that connection relations among the above-described constituent elements for installation of the test unit 200 are illustrative, and may be varied, if necessary. Hereinafter, the constituent elements will be described in detail.

The accelerator pedal sensor 110 may convert a manipulation amount of an accelerator pedal into a voltage signal. The brake pedal sensor 120 may convert a manipulation amount of a brake pedal into a voltage signal. Each of the voltage signals output from the accelerator pedal sensor 110 and the brake pedal sensor 120 is branched into two signals, one of which may be sent to the test controller 210 and the other of which may be sent to the mode switch 230.

The test controller 210 may perform a function of a data acquisition (DAQ) system. The test controller 210 includes a converter pair including an analog-to-digital converter A/D 0 and a digital-to-analog converter D/A 0, which correspond to the APS 110, and another converter pair including an analog-to-digital converter A/D 1 and a digital-to-analog converter D/A 1, which correspond to the BPS 120. Accordingly, the test controller 210 may receive a voltage signal from the APS 110 through the analog-to-digital converter A/D 0, and may output, through the digital-to-analog converter D/A 0, a voltage signal to be sent to the power train controller 140. Similarly, the test controller 210 may receive a voltage signal from the BPS 120 through the analog-to-digital converter A/D 1, and may output, through the digital-to-analog converter D/A 1, a voltage signal to be sent to the power train controller 140.

In the instant case, in accordance with modes to be described later, the signal output from each of the digital-to-analog converters D/A 0 and D/A 1 may correspond to the signal output from a corresponding one of the APS 110 and the BPS 120 without any variation, or may be the signal generated from the test controller 210, irrespective of the signal output from the corresponding APS 110 or BPS 120. When the test controller 210 generates an output signal, the output signal may be a signal to follow a vehicle speed profile applied to a present test.

The synchronization signal detector 220 may detect a time when a test starts in a chassis dynamometer, and may send a synchronization signal to the test controller 210. For the present function, the synchronization signal detector 220 may include at least one of an infrared receiver or an RGB sensor. When a test operator manipulates an infrared remote controller at a test start time, the infrared receiver may receive infrared light emitted from the remote controller and, accordingly, may sense whether or not a test starts. Meanwhile, the RGB sensor may be attached to a display of the chassis dynamometer, and may sense whether or not a test starts, through a method of detecting a user interface (UI) color on the display varying in accordance with test start.

The mode switch 230 may selectively send, to the power train controller 140, a signal output from the APS 110 or the BPS 120 or a signal output from the test controller 210 in accordance with a switch state changed in accordance with modes to be described later. Furthermore, the state of the mode switch 230 may be manually changed or may be changed under control of the test controller 210. Furthermore, the mode switch 230 may function as an emergency switch. For example, when the driver determines that an abnormal operation of the test controller 210 has occurred, the driver manipulates the mode switch 230 to cut off an output from the test controller 210 and to allow only the signal from the APS 110/BPS 120 to the power train controller 140.

In accordance with a configuration of the vehicle, the power train controller 140 may be an engine management system (EMS), a transmission control unit (TCU), or a hybrid control unit (HCU), without being limited thereto. Furthermore, the power train controller 140 may execute acceleration, speed reduction, and shifting in accordance with a voltage signal received in accordance with a switch state of the mode switch 230. Furthermore, a signal from a controller area network (CAN) bus connected to the power train controller 140 may be sent to the test controller 210. Accordingly, the test controller 210 may determine a driving state of the actual vehicle while monitoring a CAN signal including at least one of vehicle speed information, an APS value or a BPS value, and may execute feedback control for speed follow. This will be described later in more detail.

Figure 4:
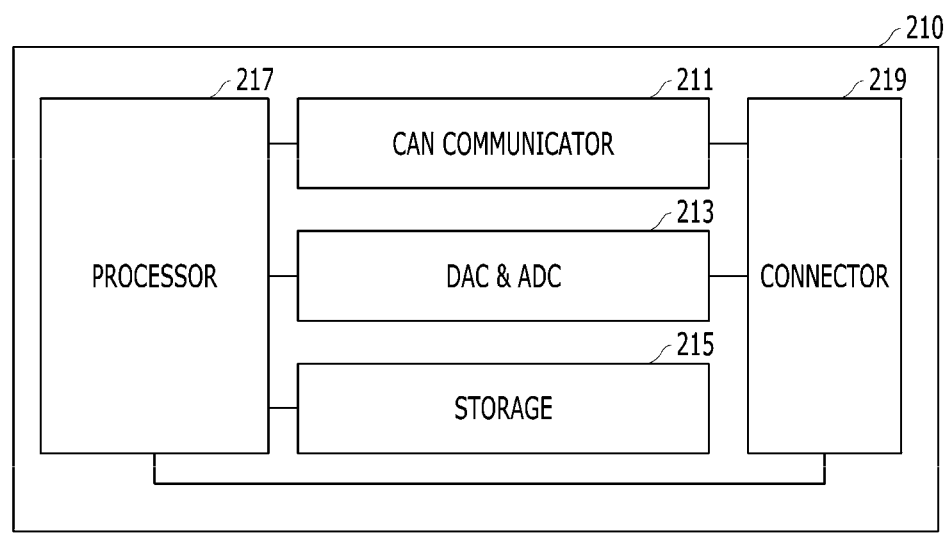
FIG. 4 is a block diagram illustrating an example of a test controller configuration according to an exemplary embodiment of the present invention.

Hereinafter, the configuration of the test controller 210 will be described in more detail with reference to FIG. 4. FIG. 4 illustrates an example of a test controller configuration according to an exemplary embodiment of the present invention.

Referring to FIG. 4, the test controller 210 may include a CAN communicator 211 for receiving a CAN signal, a converter 213 for performing conversion between an analog signal and a digital signal, a storage 215, a processor 217 for performing overall control for the above-described constituent elements and various determinations for following a vehicle speed profile, and a connector 219 to be connected to external devices such as the vehicle-side constituent elements, the synchronization signal detector, and the like.

As described above, the converter 213 includes at least the converter pair including the analog-to-digital converter A/D 0 and the digital-to-analog converter D/A 0, which correspond to the APS 110, and the converter pair including the analog-to-digital converter A/D 1 and the digital-to-analog converter D/A 1, which correspond to the BPS 120.

The storage 215 may store at least one of an operating system for driving the test controller 210, various input/output information, operation status information, or a vehicle speed profile.

The connector 219 may include a CAN line for connecting the CAN communicator 211 and the CAN bus of the vehicle, a first voltage line corresponding to an APS signal, a second voltage line corresponding to a BPS signal, a wire for connection of the connector 219 to the synchronization signal detector 220, etc.

Furthermore, the processor 217 may determine an APS value and a BPS value to follow a vehicle speed profile in accordance with modes to be described later. As described above, the processor 217 may execute feedback control for vehicle speed follow using a vehicle-side CAN signal.

Hereinafter, feedback control using the CAN signal will be concretely described.

The processor 217 may use both feedforward control and feedback control upon determining an APS value and a BPS value in a direct output mode. For example, the processor 217 operates basically in accordance with feedforward control, to determine an APS value and a BPS value according to a target vehicle speed. That is, the processor 217 derives an APS/BPS command value selected from values of 0 to 100%. The derived command value may be converted into a voltage signal in the digital-analog converter of the converter 213. In feedback control, the processor 217 compares a target speed instructed at the current time by the vehicle speed profile with vehicle speed information represented by a CAN signal, and may calibrate APS and BPS values in accordance with the results of comparison. For example, when the current vehicle speed is lower than the target vehicle speed, the processor 217 increases the APS value, to cause the current vehicle speed to follow the target vehicle speed. On the other hand, when the current vehicle speed is higher than the target vehicle speed, the processor 217 decreases the APS value. When it is difficult to follow the target vehicle speed through a decrease in APS value, speed reduction may be achieved through an increase in BPS value.

Furthermore, the processor 217 may perform calibration for feedforward control by checking an APS/BPS command value determined by the processor 217 and an APS/BPS value acquired through CAN communication in the vehicle.

Figure 5A:
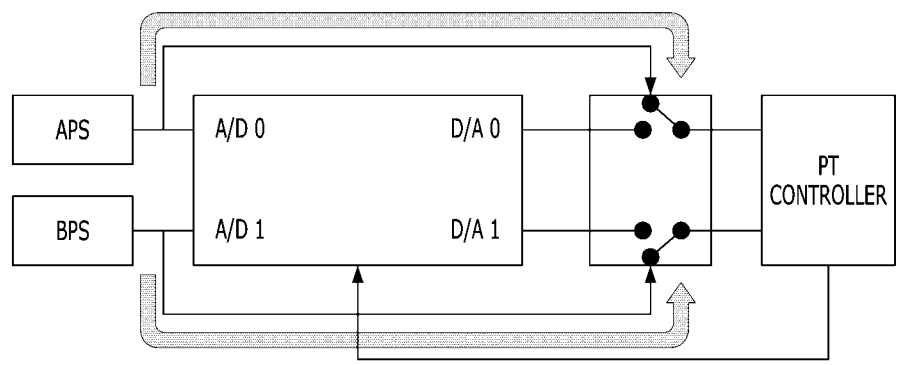
FIGS. 5A-5C are block diagrams illustrating various modes of the test system according to an exemplary embodiment of the present invention.
Figure 5B:
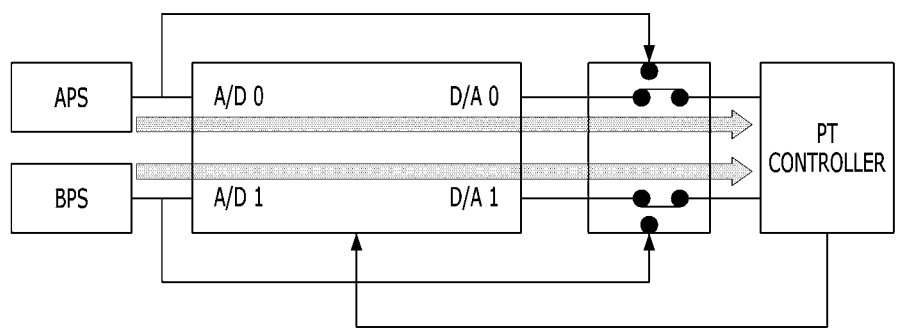
Figure 5C:
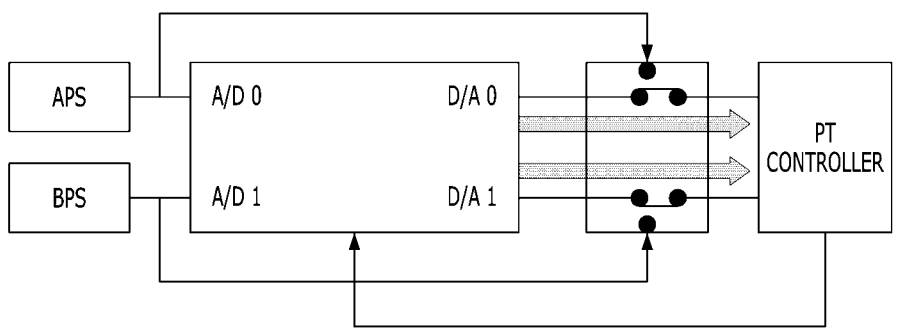

Meanwhile, the test system according to an exemplary embodiment of the present invention may support various operation modes. In a basic operation of the test system, the test unit 200 receives signals from the APS 110 and the BPS 120, and sends the received signal to the power train controller 140 after processing the received signals. The signal processing may include simple bypass, sending of a stored signal profile after deletion of the APS/BPS signals, storage along with bypass, etc., without being limited thereto. Three exemplary modes of the test system according to an exemplary embodiment of the present invention will be described with reference to FIGS. 5A-5C. FIGS. 5A-5C illustrate various modes of the test system according to an exemplary embodiment of the present invention.

First, referring to FIG. 5A, a status of the test system in a hardwired (H/W) mode is illustrated. As illustrated in FIG. 5A, in the hardwired mode, the mode switch cuts off an output from the test controller, and directly sends voltage signals from the APS and the BPS to the power train controller.

Next, referring to FIG. 5B, a status of the test system in a bypass mode is illustrated. As illustrated in FIG. 5B, in the bypass mode, signals from the APS and the BPS are sent to the power train controller via the test controller.

Next, referring to FIG. 5C, a status of the test system in a robot mode is illustrated. As illustrated in FIG. 5C, in the robot mode, signals output from the APS and the BPS are not sent to the power train controller, and only a voltage signal output from the test controller is sent to the power train controller. In the present mode, the test controller outputs an APS voltage signal and a BPS voltage signal corresponding to the vehicle speed profile through the above-described feedforward/feedback control.

Hereinafter, an operation procedure of the test system will be described in conjunction with the above-described configurations with reference to FIG. 6.

Figure 6:
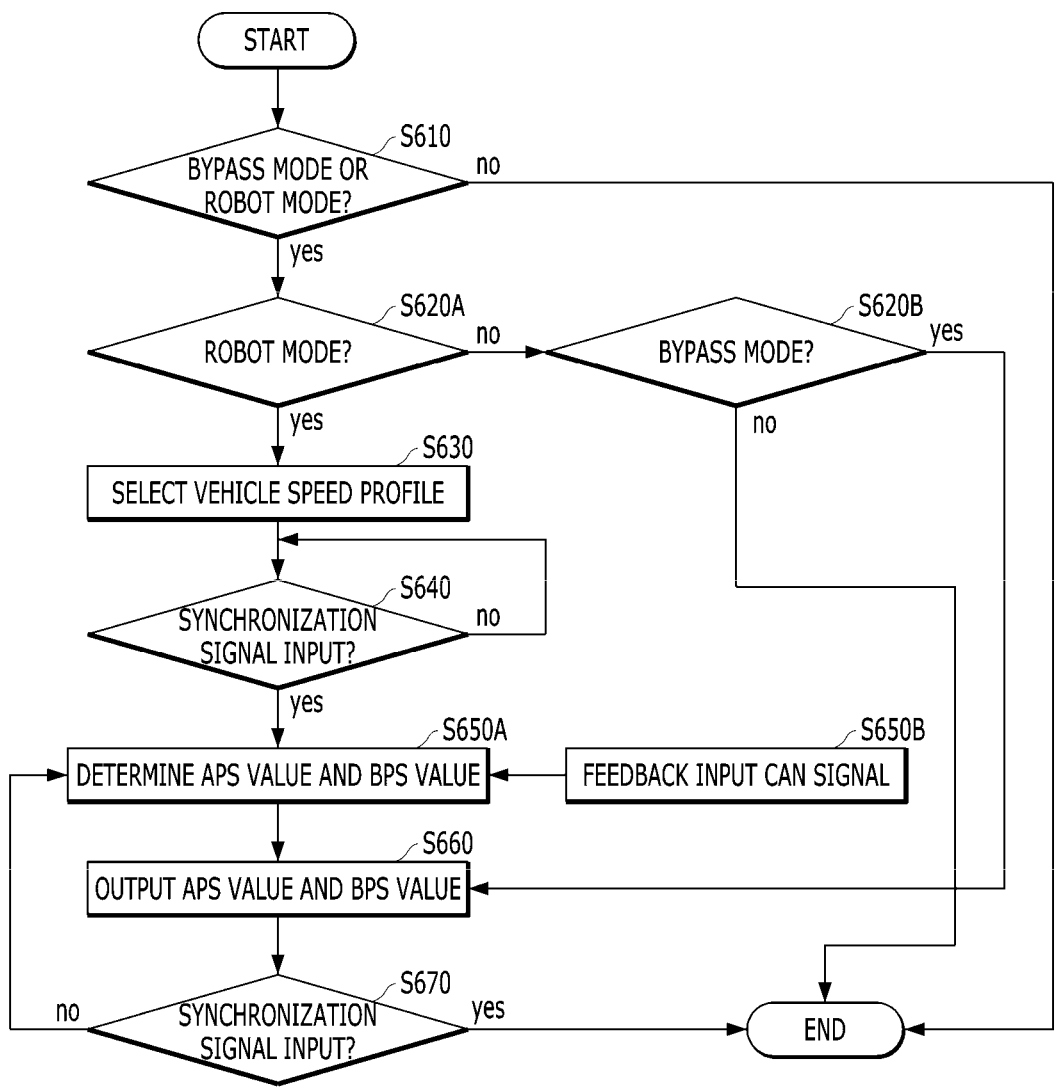
FIG. 6 is a flowchart illustrating an example of an operation procedure of the test system according to an exemplary embodiment of the present invention.

FIG. 6 illustrates an example of an operation procedure of the test system according to an exemplary embodiment of the present invention.

Referring to FIG. 6, mode determination may be first executed (S610 to S620B). Mode selection may be determined in accordance with a status of the mode switch 230 or setting of the tester.

In the case of the robot mode ("Yes" in S620A), a vehicle speed profile is selected (S630). When a synchronization signal from the synchronization signal detector 220 is input ("Yes" in S640), an APS command value and a BPS command value may be determined in the processor 217 in accordance with the vehicle speed profile (S650A). In the instant case, the APS command value and the BPS command value may be feedback controlled, based on a CAN signal input from the vehicle (S650B).

The APS command value/BPS command value determined in the processor 217 may be output in a form of a voltage value through the DAC (D/A 0 or D/A 1) corresponding to the converter 213 (S660).

The procedure of determining and outputting the APS/BPS command value may be executed in real time until the vehicle speed profile ends. When the vehicle speed profile ends ("Yes" in S670), the test ends.

In the bypass mode ("Yes" in S620B), the test controller 210 outputs voltage values of the APS 110 and the BPS 120 without any variation. In the hardwired mode ("No" in S610), the test controller 210 may not operate.

Meanwhile, in accordance with another exemplary embodiment of the present invention, the APS/BPS command value determined by the processor 217 in the robot mode may be directly sent to the power train controller 140 in a form of a CAN signal through the CAN communicator 211, without being sent to the vehicle controller in a form of a voltage signal.

Meanwhile, the present invention may be embodied as code, which may be written on a program-stored recording medium which may be read by a computer. The recording medium which may be read by a computer includes all kinds of recording media on which data which may be read by a computer system is written. Examples of recording media which may be read by a computer may be a hard disk drive (HDD), a solid state drive (SSD), a silicon disk drive (SDD), a read only memory (ROM), a random access memory (RAM), a CD-ROM, a magnetic tape, a floppy disk, an optical data storage, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a vehicle test system, the method comprising:
   determining, by a test controller, at least one of a first value representing an accelerator pedal sensor (APS) command value corresponding to a vehicle speed profile in a predetermined mode or a second value representing a brake pedal sensor (BPS) command value corresponding to the vehicle speed profile in a response that the vehicle speed profile is determined;
   converting, by the test controller, at least one of the determined first value or the determined second value, into a voltage signal; and
   sending the converted voltage signal from the test controller to a power train controller of a vehicle to be tested,
   wherein the vehicle test system includes a mode switch of selectively sending, to the power train controller, a voltage signal from an accelerator pedal sensor of the vehicle, a voltage signal from a brake pedal sensor of the vehicle and the converted voltage signal in accordance with a plurality of modes.

2. The method according to claim 1, wherein the sending the converted voltage signal includes sending the converted voltage signal to the power train controller, in place of output signals from n the accelerator pedal sensor and the brake pedal sensor of the vehicle to be tested.

3. The method according to claim 1, wherein the determining at least one of the first value or the second value includes determining a third value representing an APS command value corresponding to a current target speed instructed by the vehicle speed profile and a fourth value representing a BPS command value corresponding to the current target speed.

4. The method according to claim 3, further including:
acquiring at least information as to a current vehicle speed from a signal line of the power train controller.

5. The method according to claim 4,
wherein the determining at least one of the first value or the second value further includes determining at least one of the first value or the second value based on at least one of the at least current vehicle speed information, the third value, or the fourth value.

6. The method according to claim 4,
wherein the signal line of the power train controller includes a controller area network (CAN) line; and
wherein the vehicle speed information is included in a CAN signal.

7. The method according to claim 1,
wherein the determining is executed when a synchronization signal from a synchronization signal detector is input to the test controller.

8. The method according to claim 1,
wherein the test controller is separably connected to the vehicle to be tested via a connector to send at least the converted voltage signal.

9. The method according to claim 1,
wherein the predetermined mode is a robot mode to send the converted voltage signal among the plurality of modes.

10. A non-transitory computer-readable recording medium recorded with a program to execute the method of controlling the vehicle test system according to claim 1.

11. A vehicle test system comprising:
a test controller including a processor for determining at least one of a first value representing an accelerator pedal sensor (APS) command value corresponding to a vehicle speed profile in a predetermined mode or a second value representing a brake pedal sensor (BPS) command value corresponding to the vehicle speed profile in a response that the vehicle speed profile is determined, and a converter for converting at least one of the determined first value or the determined second value into a voltage signal;
a vehicle to be tested, the vehicle including a power train controller for receiving the converted voltage signal, and controlling a power train; and
a mode switch of selectively sending, to the power train controller, a voltage signal from an accelerator pedal sensor of the vehicle, a voltage signal from a brake pedal sensor of the vehicle and the converted voltage signal in accordance with a plurality of modes.

12. The vehicle test system according to claim 11,
wherein the converted voltage signal is sent to the power train controller, in place of output signals from the accelerator pedal sensor and the brake pedal sensor of the vehicle to be tested.

13. The vehicle test system according to claim 11,
wherein the processor is configured to determine a third value representing an APS command value corresponding to a current target speed instructed by the vehicle speed profile and a fourth value representing a BPS command value corresponding to the current target speed.

14. The vehicle test system according to claim 13,
wherein the test controller further includes a communicator for acquiring at least current vehicle speed information from a signal line of the power train controller.

15. The vehicle test system according to claim 14,
wherein the processor is configured to determine at least one of the first value or the second value based on at least one of the at least current vehicle speed information, the third value, or the fourth value.

16. The vehicle test system according to claim 14,
wherein the signal line of the power train controller includes a controller area network (CAN) line; and
wherein the vehicle speed information is included in a CAN signal.

17. The vehicle test system according to claim 11, further including:
a synchronization signal detector of determining when a test starts,
wherein the processor is configured to initiate determination of at least one of the first value or the second value in a response that a synchronization signal from the synchronization signal detector is input to the test controller.

18. The vehicle test system according to claim 11,
wherein the test controller is separably connected to the vehicle to be tested via a connector to send at least the converted voltage signal.

19. The vehicle test system according to claim 11,
wherein the predetermined mode is a robot mode to send the converted voltage signal among the plurality of modes.

* * * * *